United States Patent
Lee et al.

(10) Patent No.: US 11,206,617 B2
(45) Date of Patent: Dec. 21, 2021

(54) METHOD AND APPARATUS FOR UPLINK REPETITION ON BASIS OF SEMI-PERSISTENT SCHEDULING

(71) Applicant: LG ELECTRONICS INC., Seoul (KR)

(72) Inventors: Hyunho Lee, Seoul (KR); Seungmin Lee, Seoul (KR); Kyuhwan Kwak, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/964,049

(22) PCT Filed: Jan. 31, 2019

(86) PCT No.: PCT/KR2019/001332
§ 371 (c)(1),
(2) Date: Jul. 22, 2020

(87) PCT Pub. No.: WO2019/151789
PCT Pub. Date: Aug. 8, 2019

(65) Prior Publication Data
US 2021/0051596 A1   Feb. 18, 2021

Related U.S. Application Data

(60) Provisional application No. 62/624,122, filed on Jan. 31, 2018, provisional application No. 62/669,356, (Continued)

(51) Int. Cl.
*H04W 52/14* (2009.01)
*H04W 52/10* (2009.01)
(Continued)

(52) U.S. Cl.
CPC ......... *H04W 52/146* (2013.01); *H04W 52/10* (2013.01); *H04W 52/242* (2013.01); *H04W 52/32* (2013.01)

(58) Field of Classification Search
CPC ... H04W 52/146; H04W 52/26; H04W 52/10; H04W 52/242
(Continued)

(56) References Cited

U.S. PATENT DOCUMENTS

| | | | |
|---|---|---|---|
| 8,830,904 B2* | 9/2014 | Kim | H04W 52/343 370/318 |
| 2016/0353440 A1* | 12/2016 | Lee | H04W 72/0453 |
| 2019/0037569 A1* | 1/2019 | Lee | H04W 52/48 |

FOREIGN PATENT DOCUMENTS

| | | |
|---|---|---|
| KR | 1020100076843 A | 7/2010 |
| KR | 1020160101044 A | 8/2016 |

(Continued)

*Primary Examiner* — John J Lee
(74) *Attorney, Agent, or Firm* — Dentons US LLP

(57) ABSTRACT

A method for a terminal for transmitting a signal in a wireless communication system according to one embodiment of the present invention comprises: receiving repeated transmission related information comprising the count N by which an uplink signal transmission is to be repeated from a base station; determining the transmission power of the uplink signal; and transmitting repeatedly the uplink signal N times by the determined transmission power on the basis of the repeated transmission related information, wherein the terminal can determine the transmission power of the uplink signal on the basis of the count N by which the transmission of the uplink signal is to be repeated. The terminal is capable of communicating with at least one of another terminal, a terminal related to an autonomous driving vehicle, a base station or a network.

12 Claims, 10 Drawing Sheets

Related U.S. Application Data filed on May 9, 2018, provisional application No. 62/670,036, filed on May 11, 2018, provisional application No. 62/673,113, filed on May 17, 2018, provisional application No. 62/675,671, filed on May 23, 2018.

(51) Int. Cl.
*H04W 52/24* (2009.01)
*H04W 52/32* (2009.01)

(58) Field of Classification Search
USPC .............................. 455/522, 69, 452.1, 509
See application file for complete search history.

(56) References Cited

FOREIGN PATENT DOCUMENTS

| KR | 1020160114688 A | 10/2016 |
| KR | 1020160131074 A | 11/2016 |
| WO | 2016182320 A1 | 11/2016 |

\* cited by examiner

METHOD AND APPARATUS FOR UPLINK REPETITION ON BASIS OF SEMI-PERSISTENT SCHEDULING

This application is the National Stage filing under 35 U.S.C. 371 of International Application No. PCT/KR2019/001332 filed Jan. 31, 2019, which claims the benefit of U.S. Provisional Application Nos. 62/624,122 filed Jan. 31, 2018; 62/669,356 filed May 9, 2018; 62/670,036 filed May 11, 2018; 62/673,113 filed May 17, 2018 and 62/675,671 filed May 23, 2018, the contents of which are all hereby incorporated by reference herein in their entirety.

TECHNICAL FIELD

The present disclosure relates to a wireless communication system, and more particularly, to a method of repeating an uplink signal between a terminal and a base station based on semi-persistent scheduling (SPS) and apparatus therefor.

BACKGROUND ART

The latency of packet data is one of important performance metrics. Thus, reducing the packet data latency and providing rapid Internet access to end users are considered as one important issue in designing a next-generation mobile communication system, so called new radio access technology (RAT), as well as the long term evolution (LTE) system.

DISCLOSURE

Technical Problem

The object of the present disclosure is to provide a method of transmitting and receiving an uplink signal efficiently and accurately between a terminal and a base station and apparatus therefor.

It is to be understood that both the foregoing general description and the following detailed description of the present disclosure are exemplary and explanatory and are intended to provide further explanation of the disclosure as claimed.

Technical Solution

In an aspect of the present disclosure, provided herein is a method of transmitting a signal by a user equipment (UE) in a wireless communication system. The method may include receiving, from a base station, information related to repeated transmission including the number of times an uplink signal is repeatedly transmitted, N, determining the transmission power of the uplink signal, and repeatedly transmitting the uplink signal N times with the determined transmission power based on the information related to the repeated transmission. The UE may determine the transmission power of the uplink signal based on the number of times the uplink signal is repeatedly transmitted, N.

In another aspect of the present disclosure, a UE is provided herein. The UE may include a transceiver and a processor. The processor may be configured to control the transceiver to receive, from a base station, information related to repeated transmission including the number of times an uplink signal is repeatedly transmitted, N, determine the transmission power of the uplink signal, and repeatedly transmit the uplink signal N times with the determined transmission power based on the information related to the repeated transmission. The processor may be configured to determine the transmission power of the uplink signal based on the number of times the uplink signal is repeatedly transmitted, N.

The UE may be configured with a plurality of power control parameter sets, and the UE may select one of the plurality of power control parameter sets based on the number of times the transmission is repeated, N.

Each of the plurality of power control parameter sets may be an open loop power control (OLPC) parameter set including a nominal power value P0.

When the number of times the transmission is repeated, N is more than a threshold, the UE may select a first power control parameter set. When the number of times the transmission is repeated, N is less than or equal to the threshold, the UE may select a second power control parameter set. The transmission power determined based on the first power control parameter set may be different from the transmission power determined based on the second power control parameter set.

The UE may receive information including a transmission power control (TPC) command for closed loop power control (CLPC) from the base station, and the UE may determine an increment or decrement value of the transmission power according to the TPC command based on the number of times the transmission is repeated, N.

The UE may maintain the determined transmission power while repeatedly transmitting the uplink signal N times.

The uplink signal may include at least one of a physical uplink control channel (PUCCH) and a physical uplink shared channel (PUSCH).

The PUSCH may be a semi-persistent scheduling (SPS) PUSCH transmitted based on SPS.

Advantageous Effects

According to the present disclosure, when an uplink signal is repeatedly transmitted, the reliability of uplink transmission may be improved. In addition, since the transmission power is determined based on the number of times the uplink signal is repeated, a user equipment (UE) may use its limited power more efficiently.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure, illustrate embodiments of the disclosure and together with the description serve to explain the principle of the disclosure. In the drawings.

BEST MODE

Figure 1:
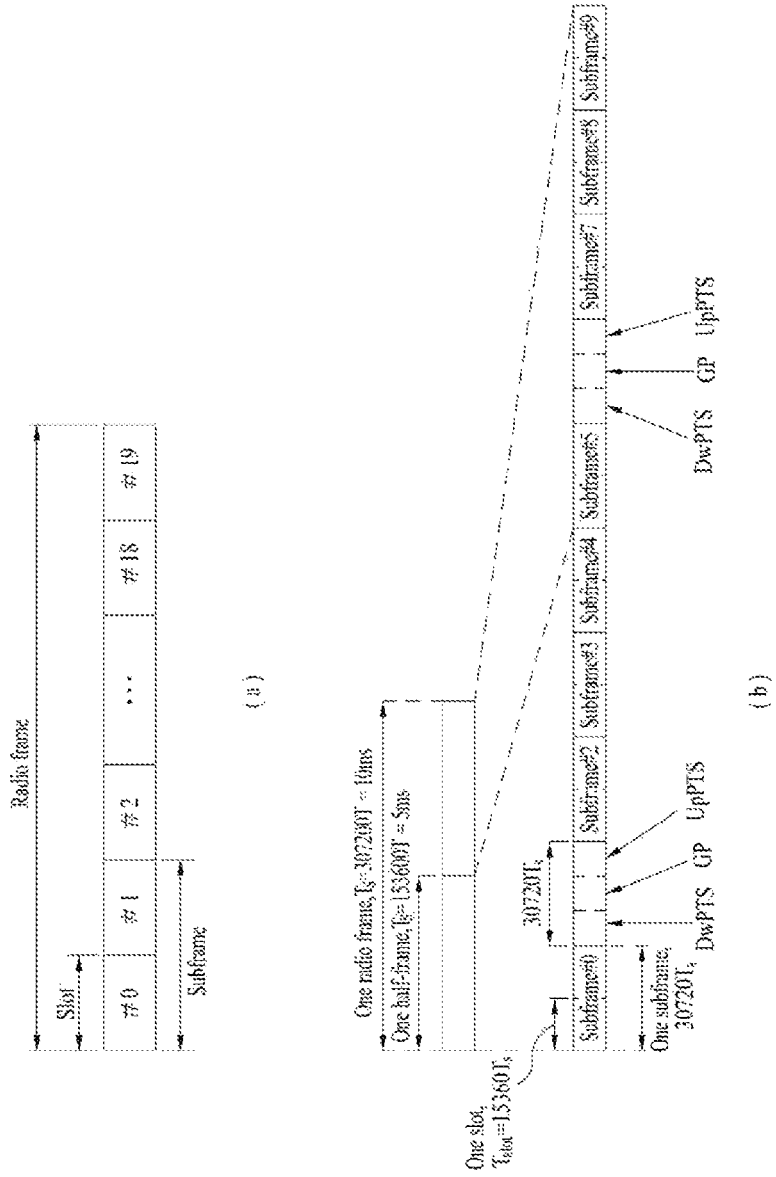
FIG. 1 is a diagram showing an example of a radio frame structure used in a wireless communication system.

Reference will now be made in detail to the preferred embodiments of the present disclosure, examples of which are illustrated in the accompanying drawings. The accompanying drawings illustrate exemplary embodiments of the present disclosure and provide a more detailed description of the present disclosure. However, the scope of the present disclosure should not be limited thereto.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present disclosure, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present disclosure, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present disclosure with respect to a method of performing coordinated data transmission using some or all nodes can be applied to various types of multi-node systems. For example, a node refers to an antenna group spaced apart from another node by a predetermined distance or more, in general. However, embodiments of the present disclosure, which will be described below, can even be applied to a case in which a node refers to an arbitrary antenna group irrespective of node interval. In the case of an eNB including an X-pole (cross polarized) antenna, for example, the embodiments of the preset disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present disclosure, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present disclosure, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present disclosure, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, u denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |

TABLE 2-continued

|  | Normal cyclic prefix in downlink | | | Extended cyclic prefix in downlink | | |
| --- | --- | --- | --- | --- | --- | --- |
|  |  | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 3 | $24144 \cdot T_s$ |  |  | $25600 \cdot T_s$ |  |  |
| 4 | $26336 \cdot T_s$ |  |  | $7680 \cdot T_s$ | $4384 \cdot T_s$ | $*5120 \cdot T_s$ |
| 5 | $6592 \cdot T_s$ | $4384 \cdot T_s$ | $*5120 \cdot T_s$ | $20480 \cdot T_s$ |  |  |
| 6 | $19760 \cdot T_s$ |  |  | $23040 \cdot T_s$ |  |  |
| 7 | $21952 \cdot T_s$ |  |  | $12800 \cdot T_s$ |  |  |
| 8 | $24144 \cdot T_s$ |  |  | — |  |  |
| 9 | $13168 \cdot T_s$ |  |  | — | — | — |

Figure 2:
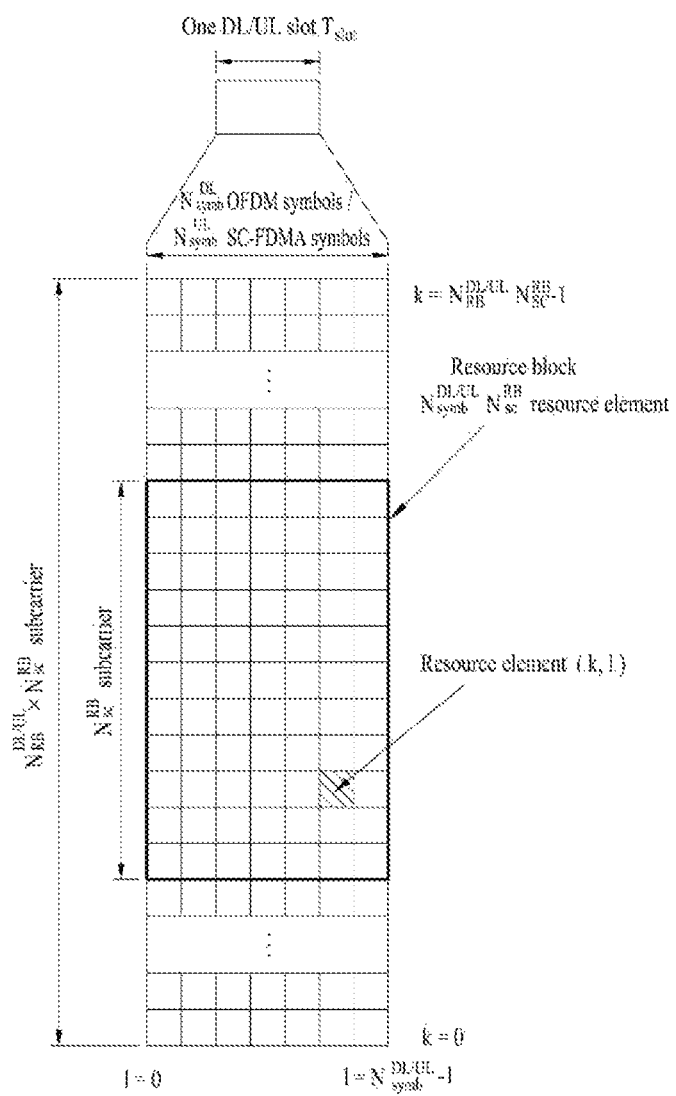
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present disclosure can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL}$/UL (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB}-1$ in the frequency domain and 1 is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
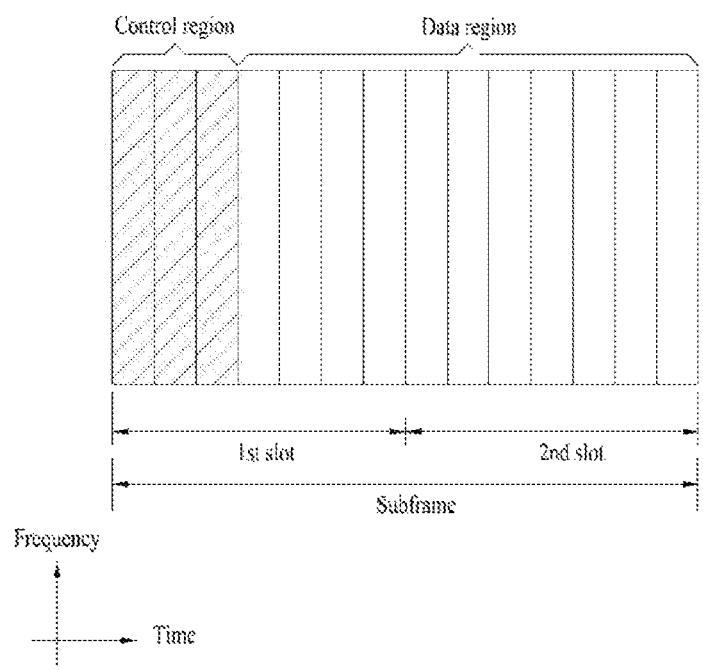
FIG. 3 is a diagram showing an example of a DL subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space $S_k^{(L)}$ Aggregation Level L | Size[in CCEs] | Number of PDCCH candidates $M^{(L)}$ |
| --- | --- | --- | --- |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
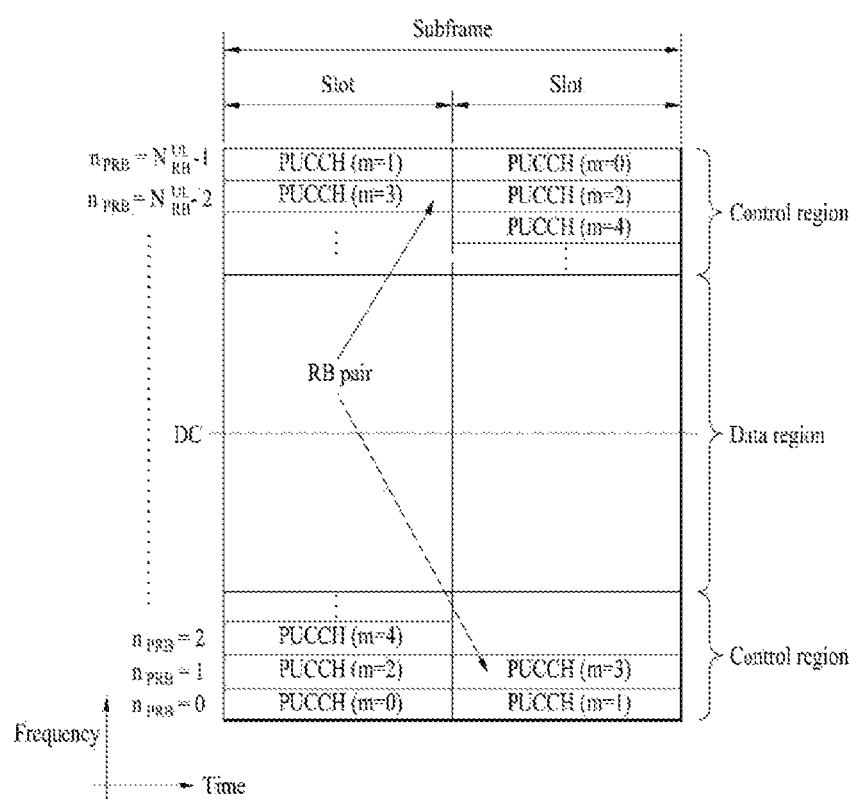
FIG. 4 is a diagram showing an example of a UL subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe | Usage | Etc. |
| --- | --- | --- | --- | --- |
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

UL TPC in LTE(-A) System

Hereinafter, the UL TPC in the LTE system will be described.

A method by which a UE controls its UL transmit power includes open loop power control (OLPC) and closed loop power control (CLPC). In the former case, the UE controls its power by estimating the attenuation of a DL signal from an eNB of a cell to which the UE belongs and compensating for the attenuation. That is, when the DL signal attenuation increases as the distance between the UE and eNB increases, the UE increases its UL transmit power. In the latter case, the eNB directly transmits information (i.e. control signals) required to control the UL transmit power.

Equation 1 below determines the transmit power of a UE in a system supporting carrier aggregation when only a PUSCH is transmitted in a subframe with subframe index i of serving cell c, instead of simultaneously transmitting the PUSCH with a PUCCH therein.

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm]$$ [Equation 1]

Equation 2 below determines PUSCH transmit power when a PUCCH and a PUSCH are simultaneously transmitted in a subframe with subframe index i of serving cell c in a system supporting carrier aggregation.

$$P_{PUSCH,c}(i) = \min\begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm]$$ [Equation 2]

The parameters, which will be described with reference to Equations 1 and 2, are to determine UL PUSCH transmit power of a UE in serving cell c. Here, $P_{CMAX,c}(i)$ of Equation 1 denotes the maximum transmit power of the UE in subframe index i, and $\hat{P}_{CMAX,c}(i)$ of Equation 2 denotes the linear value of $P_{CMAX,c}(i)$. $\hat{P}_{PUCCH}(i)$ of Equation 2 denotes the linear value of $P_{PUCCH}(i)$, where $P_{PUCCH}(i)$ is PUCCH transmit power in subframe index i.

In Equation 1, $M_{PUSCH,c}(i)$ is a parameter indicating the bandwidth for PUSCH resource allocation, which is represented as the number of RBs valid for subframe index i, and it is assigned by an eNB. $P_{O\_PUSCH,c}(i)$ is a parameter indicating the sum of a cell-specific nominal component $P_{O\_NOMINAL\_PUSCH,c}(j)$, which is provided by higher layers, and a UE-specific component $P_{O\_UE\_PUSCH,c}(j)$, which is provided by higher layers, and it is signaled by the eNB to the UE.

If the PUSCH is transmitted/retransmitted according to a UL grant, j is set to 1. If PUSCH is transmitted/retransmitted according to a random access response, j is set to 2. In addition, $P_{O\_UE\_PUSCH,c}(2)=0$ and $P_{O\_NOMINAL\_PUSCH,c}(2)=P_{O\_PRE}+\Delta_{PREAMBLE\_Msg3}$, and in this case, the parameters $P_{O\_PRE}$ and $\Delta_{PREAMBLE\_Msg3}$ are signaled by higher layers.

A path loss compensation factor, $\alpha_c(j)$ is a cell-specific parameter provided by higher layers and transmitted with 3 bits from the eNB. For j=0 or 1, the following condition is satisfied: $\alpha \in \{0, 0.4, 0.5, 0.6, 0.7, 0.8, 0.9, 1\}$. For j=2, $\alpha_c(j)=1$. The value of $\alpha_c(j)$ is signaled to the UE by the eNB.

$PL_c$ is a DL path loss (or signal loss) estimate value, which is calculated by the UE in the unit of dB and represented as follows: $PL_c$=referenceSignalPower−higher layer filteredRSRP. Here, referenceSignalPower may be signaled to the UE by the eNB via higher layers.

In addition, $f_c(i)$ is a value indicating the current PUSCH power control adjustment state for subframe index i, and it may be expressed as a current absolute value or an accumulated value. When accumulation is enabled by a parameter provided by higher layers or when a TPC command $\delta_{PUSCH,c}$ is included in a PDCCH along with DCI format 0 for serving cell c where CRC is scrambled with a temporary C-RNTI, the following equation of $f_c(i)=f_c(i-1)+\delta_{PUSCH,c}(i-K_{PUSCH})$ is satisfied. In this case, $\delta_{PUSCH,c}(i-K_{PUSCH})$ is signaled through the PDCCH with DCI format 0/4 or 3/3A in subframe $i-K_{PUSCH}$. Here, $f_c(0)$ is the first value after reset of the accumulated value.

According to the LTE specifications, the value of $K_{PUSCH}$ is defined as follows.

For frequency division duplex (FDD), $K_{PUSCH}$ has a value of 4. For time division duplex (TDD), $K_{PUSCH}$ has values shown in Table 5.

TABLE 5

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

In other cases except the DRX state, a UE attempts to decode a PDCCH of DCI format 0/4 with its C-RNTI or decode a PDCCH of DCI format 3/3A and a DCI format for an SPS C-RNTI with its TPC-PUSCH-RNTI in every subframe. If DCI formats 0/4 and 3/3A for serving cell c are detected in the same subframe, the UE should use $\delta_{PUSCH,c}$ provided in DCI format 0/4. When there is no TPC command decoded for serving cell c, when DRX occurs, or when a subframe with index i is not a UL subframe in the TDD, $\delta_{PUSCH,c}$ is 0 dB.

The $\delta_{PUSCH,c}$ accumulated values signaled on the PDCCH with DCI format 0/4 are shown in Table 6. When the PDCCH with DCI format 0 is validated through SPS activation or released, $\delta_{PUSCH,c}$ is 0 dB. The $\delta_{PUSCH,c}$ accumulated values signaled on the PDCCH with DCI format 3/3A are one of SET 1 shown in Table 6 or one of SET 2 shown in Table 7, which is determined by the TCP-index parameter provided by higher layers.

TABLE 6

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 7

| TPC Command Field in DCI format 3A | Accumulated $\delta_{PUSCH,\,c}$ [dB] |
|---|---|
| 0 | −1 |
| 1 | 1 |

If a UE reaches the maximum transmit power in serving cell c, $\hat{P}_{CMAXc}(i)$, positive TPC commands are not accumulated for serving cell c. On the contrary, if the UE reaches the minimum transmit power, negative TPC commands are not accumulated.

Equation 3 below shows UL power control for a PUCCH in the LTE system.

$$P_{PUCCH}(i) = \min\begin{cases} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{cases} [dBm]$$ [Equation 3]

In Equation 3, i denotes a subframe index, and c denotes a cell index. When a UE is configured by higher layers to transmit a PUCCH on two antenna ports, $\Delta_{TxD}(F')$ is provided to the UE by the higher layers. Otherwise, $\Delta_{TxD}(F')$ is 0. The following parameters are related to a serving cell with cell index c.

Here, $P_{CMAX,c}(i)$ denotes the maximum transmit power of a UE, and $P_{0\_PUCCH}$ is a parameter configured with the sum of cell-specific parameters and provided by the eNB through higher layer signaling. $PL_C$ is a downlink path loss (or signal loss) estimate, which is calculated by the UE in the unit of dB and represented as follows: $PL_C$=referenceSignalPower−higher layer filteredRSRP. In addition, h(n) is a value depending on PUCCH formats, $n_{CQI}$ is the number of information bits for channel quality information (CQI), and $n_{HARQ}$ denotes the number of HARQ bits. As a relative value with respect to PUCCH format 1a, $\Delta_{F\_PUCCH}(F)$ corresponds to PUCCH format #F, which is provided by the eNB through higher layer signaling. Further, g(i) denotes the current PUCCH power control adjustment state of a subframe with index i.

If the value of $P_{0\_UE\_PUCCH}$ is changed by higher layers, g(0)=0. Otherwise, g(0)=$\Delta P_{rampup}$+$\delta_{msg2}$. Here, $\delta_{msg2}$ is a TPC command indicated by a random access response, and $\Delta P_{rampup}$ corresponds to the total power ramp-up from the first to last preambles provided by higher layers.

If a UE reaches the maximum transmit power in a primary cell $P_{CMAX,c}(i)$, positive TPC commands are not accumulated for the primary cell. On the contrary, if the UE reaches the minimum transmit power, negative TPC commands are not accumulated. The UE resets accumulation when the value of $P_{0\_UE\_PUCCH}$ is changed by higher layers or a random access response message is received.

Tables 8 and 9 below show the values of $\delta_{PUCCH}$ indicated by TPC command fields in DCI formats. In particular, Table 8 shows the values of PUCCH indicated by DCI except DCI format 3A and Table 9 shows the values of PUCCH indicated by DCI format 3A.

TABLE 8

| TPC Command Field in DCI format 1A/1B/1D/2A/2B/2C/2D/2/3 | $\delta_{PUCCH}$ [dB] |
|---|---|
| 0 | −1 |
| 1 | 0 |
| 2 | 1 |
| 3 | 3 |

TABLE 9

| TPC Command Field in DCI format 3A | $\delta_{PUCCH}$ [dB] |
|---|---|
| 0 | −1 |
| 1 | 1 |

Transmission Time Interval (TTI)

Figure 5:
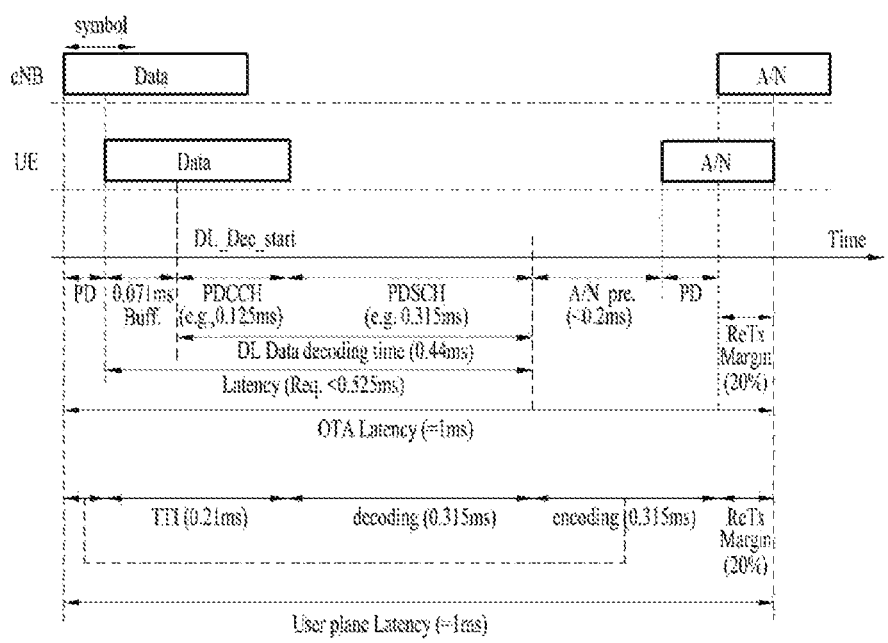
FIG. 5 is a diagram showing reduction in a TTI length according to reduction in user plane latency.

To satisfy the aforementioned reduction in latency, i.e., low latency, it may be required to reduce TTI that is a minimum unit of data transmission to newly design a shortened TTI (sTTI) of 0.5 msec or less. For example, as illustrated in FIG. 5, to shorten user plane (U-plane) latency to a time point when a UE completely transmits ACK/NACK (A/N) from a time point when an eNB begins to transmit data (PDCCH and PDSCH) to 1 msec, a sTTI may be configured in units of about 3 OFDM symbols.

Figure 6:
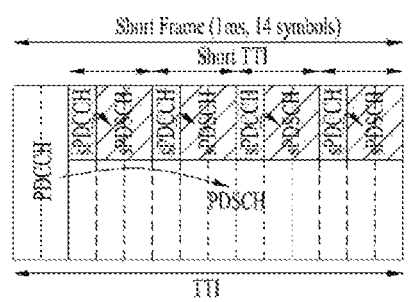
FIG. 6 is a diagram showing an example in which a plurality of short TTIs is set in one subframe.

In a DL environment, a PDCCH (i.e., sPDCCH) for data transmission/scheduling in such a sTTI and a PDSCH (i.e., sPDSCH) for transmission in the sTTI may be transmitted and, for example, as illustrated in FIG. 6, a plurality of sTTIs may be configured using different OFDM symbols in one subframe. Particularly, OFDM symbols included in the sTTI may be configured by excluding OFDM symbols transmitted by legacy control channels. The sPDCCH and the sPDSCH may be transmitted in the sTTI in the form of time division multiplexing (TDM) using different OFDM symbol regions and may be transmitted in the form of frequency division multiplexing (FDM) using different PRB domain/frequency resources.

In a UL environment as similar with the DL environment, data transmission/scheduling in a sTTI is allowed, channels corresponding to a legacy TTI based PUCCH and PUSCH are referred to as sPUCCH and sPUSCH, respectively.

Figure 7:
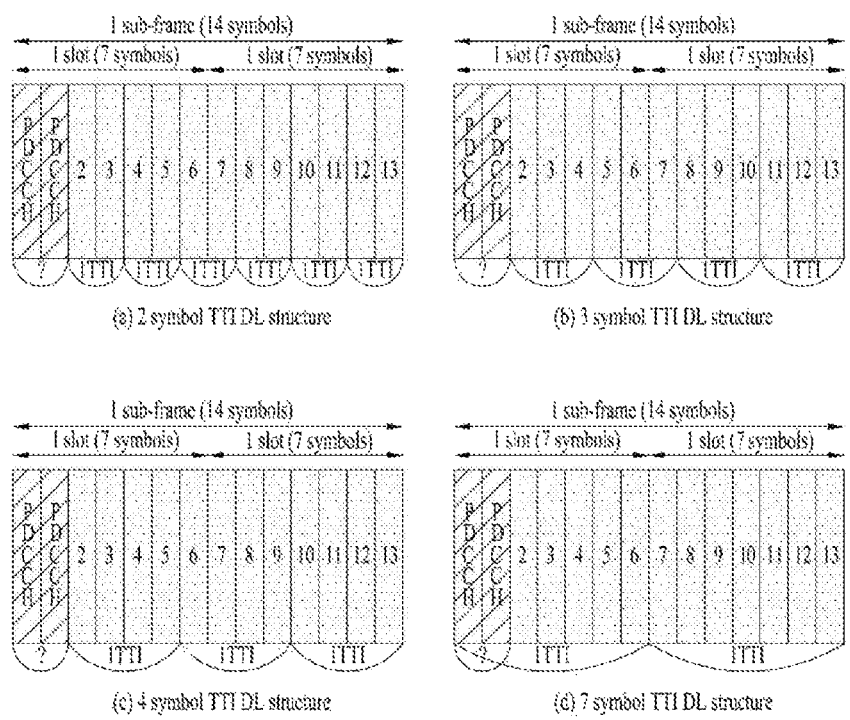
FIG. 7 is a diagram showing a DL subframe structure including a short TTI with a plurality of lengths (symbol numbers)

In the specification, the present disclosure is described below in terms of an LTE/LTE-A system. In an existing LTE/LTE-A, when having a normal CP, a subframe of 1 ms may include 14 OFDM symbols and, when a symbol is configured with a TTI in a shorter unit than 1 ms, a plurality of TTIs may be configured in one subframe. A method of configuring a plurality of TTIs may configure two symbols, three symbols, four symbols, and seven symbols as one TTI, as in an embodiment shown in FIG. 7 below. Although not shown, the case in which one symbol is configured as a TTI may also be configured. When one symbol is one TTI unit, 12 TTIs may be generated on the assumption that a legacy PDCCH is transmitted in two OFDM symbols. Similarly, as shown in FIG. 7A, when two symbols correspond to one TTI unit, 6 TTIs may be generated, as shown in FIG. 7B, when three symbols correspond to one TTI unit, 4 TTIs may be generated and, as shown in FIG. 7C, when four symbols correspond to one TTI unit, 3 TTIs may be generated. Needless to say, in this case, first two OFDM symbols may be assumed to transmit a legacy PDCCH.

As shown in FIG. 7D, when seven symbols are configured with one TTI, one TTI of seven symbol units including a legacy PDCCH and seven subsequent symbols may be configured as one TTI. In this case, in the case of a UE that supports a sTTI, when one TTI includes seven symbols, it may be assumed that puncture or rate-matching is performed on two OFDM symbols positioned at a fore end for transmitting a legacy PDCCH with respect to a TTI (first symbol) positioned at a fore end of one subframe and it may be assumed that corresponding data and/or control information are transmitted in five symbols. On the other hand, it may be assumed that a UE is capable of transmitting data and/or control information all seven symbols without a punctured or rate-matched resource region with respect to a TTI (second slot) positioned at a rear end of one subframe.

Figure 8:
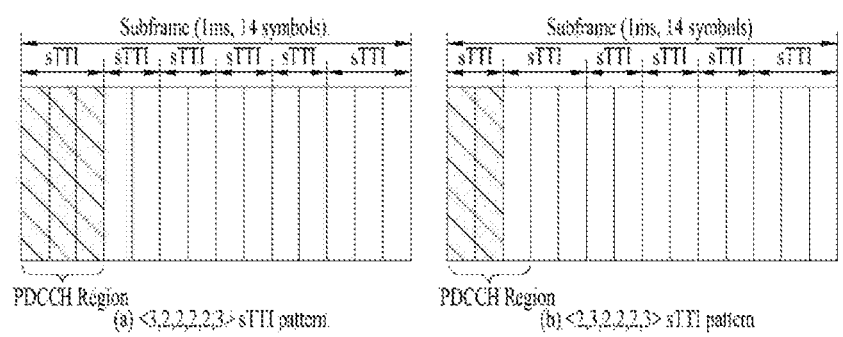
FIG. 8 is a diagram showing a DL subframe structure including a short TTI including two or three symbols.

According to the present disclosure, a sTTI including two OFDM symbols (hereinafter, "OS") and a sTTI including three OSs may be considered to include sTTI structures that are combined and present in one subframe, as shown in FIG. 8. The sTTI including 2-OS or 3-OS sTTIs may be simply defined as 2-symbol sTTI (i.e., 2-OS sTTI). Also, 2-symbol sTTI or 3-symbol sTTI may be simply referred to as 2-symbol TTI or 3-symbol TTI, respectively, and it is clear that these are TTIs shorter than the 1 ms TTI, which is the legacy TTI, which is the premise of the present disclosure. That is, in the specification, the term "TTI" is referred to instead of sTTI, the term TTI means the sTTI, and regardless of its name, what the present disclosure proposes is a communication scheme in a system composed of TTIs shorter than a legacy TTI.

Also, in this specification, numerology refers to defining a length of a TTI to be applied to the wireless communication system, a subcarrier interval and the like, or a parameter or a communication structure or system based on the parameter such as the defined length of the TTI or sub-carrier spacing.

As shown in FIG. 8A, a sPDCCH may also be transmitted depending on the number of symbols of a PDCCH in a <3,2,2,2,2,3> sTTI pattern. In a <2,3,2,2,2,3> sTTI pattern of FIG. 8B, it may be difficult to transmit a sPDCCH due to a legacy PDCCH region.

UL Transmission with Repetition

The next-generation system (e.g., 5G new RAT) aims to use wide frequency bands and support various services or requirements. For example, ultra-reliable and low-latency communications (URLLC), which is one of representative scenarios, requires low latency and high reliability compliant with 3GPP NR requirements. Specifically, the URLLC requires support of user plane latency of 0.5 ms and transmission of X-byte data within 1 ms with an error rate less than 10^−5. Generally, the traffic volume of enhanced mobile broadband (eMBB) is high, but the file size of URLLC traffic is less than tens or hundreds of bytes and the traffic sporadically occurs. Thus, for the eMBB, a transmission method capable of maximizing the transfer rate and minimizing the overhead of control information is required, and for the URLLC, a transmission method capable of using a short scheduling time unit and guaranteeing reliability is required.

Depending on application fields or traffic types, various reference time units may be assumed/used to transmit and receive a physical channel. The reference time unit may refer to a basic unit for scheduling a specific physical channel and vary depending on the number of symbols included in a corresponding scheduling unit and/or subcarrier spacing (SCS).

In the present disclosure, a slot or a mini-slot is used as the reference time unit for convenience of description. The slot may refer to a basic scheduling unit used for normal data traffic (e.g., eMBB). The mini-slot may have a shorter time period than the slot in the time domain and refer to a basic scheduling unit used for special traffic or communication (e.g., URLLC, unlicensed band, millimeter wave, etc.). However, this is merely exemplary, and it is apparent that the present disclosure is extended and applied when a physical channel is transmitted and received based on the mini-slot in the eMBB or when a physical channel is transmitted and received based on the slot in the URLLC or other communication methods.

[Proposal 1] UL Repetition with SPS

In the case of URLLC services or traffic with strict block error rate (BLER)/latency/reliability requirements, time-domain repetition may be considered. For example, repetition may be applied to a corresponding channel on a TTI/slot/symbol basis to achieve high reliability (and/or short latency) in a specific transport block/code block (TB/CB) (or CB group). The repetition may be applied to semi-persistent scheduling (SPS) or PDCCH-less channel transmission similar to the SPS. The repetition may be similar to TTI bundling, or it may be applied in the form of grant-free UL channel repetition transmission where a UL channel is transmitted on a resource preconfigured by higher layer signaling, which is considered in the NR system.

[Proposal 1-1]

When repetition is configured/indicated on a TTI/slot/symbol basis for a specific TB/CB (group), it may be desirable to maintain transmit power of a UE during the corresponding repetition. Otherwise, an undesirable power transient period may occur during the repetition, and due to the power transient period, there may be restrictions in DMRS bundling/sharing between multiple TTIs/slots, which is necessary for DMRS overhead reduction. However, in the case of carrier aggregation (CA) or simultaneous PUSCH/PUCCH transmission, the UE may be in a power-limited state in some TTIs/slots/symbols during the repetition, and thus, the power needs to be changed. To this end, the present disclosure proposes the following UE behavior.

Option 1: The UE maintains the same power for all TTIs/slots/symbols corresponding to the repetition. In this case, power may need to be allocated to other TTIs/slots/symbols in a different way from the conventional power allocation rule. For example, when a PUCCH and a PUSCH are simultaneously transmitted, power is allocated first to the PUCCH, and then the remaining power is allocated to the PUSCH. However, according to Option 1, it may be regulated that during the repetition, the UE needs to allocate power to the PUSCH first and then allocate the remaining power to the PUSCH.

Option 2: When the UE recognizes that there is a TTI/slot/symbol where power needs to be changed during the repetition, the UE may terminate the repetition.

To reduce delay in a UL data channel, which results from scheduling request (SR) or scheduling delay, SPS based, grant-free based, or TTI bundling based UL transmission may be considered. Such UL transmission may reduce control overhead (e.g., control channel overhead). In the case of URLLC services or traffic with strict BLER/latency/reliability requirements, repetition may be considered together. Thus, Option 1/2 may be applied to SPS based or grant-free based UL repetition transmission.

[Proposal 1-2]

When repetition is configured/indicated on a TTI/slot/symbol basis for a specific TB/CB (group), it may be regulated that a network needs to provide a UE information about a time duration in which DMRS bundling/sharing is applied on the TTI/slot/symbol basis. Specifically, the network may allocate a different RS scrambling ID to each time duration in which the DMRS bundling/sharing is applied, provide information about phase continuity in DCI, or preconfigure the time duration in which DMRS bundling/sharing is applied through semi-static signaling (e.g., RRC signaling).

[Proposal 1-3]

Since there is no UL grant DCI for scheduling each channel in SPS based or grant-free based UL transmission, TPC update may be performed by group-common DCI (e.g., DCI format 3/3A in the LTE) for the purpose of closed-loop power adjustment in the SPS based or grant-free based UL transmission. If repetition is configured/indicated for the SPS based, grant-free based, or TTI bundling based UL transmission, the TPC update may need to be defined.

For example, it is assumed that TPC information is transmitted in an {i-K_PUSCH}-th TTI and a UE applies the TPC information to an i-th TTI. If the i-th TTI is located in the middle of repetition for a specific TB/CB (group), it may be regulated that the TPC update (e.g., the application of the TPC information) is not applied to all TTIs/slots/symbols corresponding to the repetition. In this case, the TPC update based on the corresponding TPC information may be applied starting from a TTI corresponding to the first transmission opportunity after the repetition. As another method, when the TPC update is applied to a specific TTI during the repetition, it may be regulated that DMRS bundling/sharing is not applied between the TTI to which the TPC update is applied and a TTI before the TPC update is applied.

[Proposal 1-3a]

As another method, when conditions (i), (ii), (iii), and (iv) are all satisfied:
(i) Repetition is configured/indicated for SPS based, grant-free based, or TTI bundling based UL transmission;
(ii) The timeline for TPC application (e.g., subframe) is different from the TTI length of the UL transmission (e.g., sTTI);
(iii) It is regulated that a TPC command is transmitted in an {i-K_PUSCH}-th subframe and applied to an i-th subframe; and
(iv) The i-th subframe is within repetition for a specific TB/CB (group), The corresponding TPC command may be applied to the first sTTI after the completion of the repetition or a sTTI behind a predetermined number of sTTIs, which predefined or signaled, after the completion of the repetition. Specifically, the sTTI to which the TPC command is applied may be a sTTI included in the i-th subframe. In this case, the TPC command may be applied to some sTTIs of the i-th subframe. For example, when a UE performs the repetition in subframe #m−1 and subframe #m after receiving the TPC command in subframe #m−4, it may be regulated that update is performed from the first slot/subslot based on the corresponding TPC command after the completion of the repetition in subframe #m.

[Proposal 1-4]

In the case of SPS based or grant-free based UL transmission, the HARQ process ID for initial transmission may be determined by a TTI index.

For example, in the LTE system, the HARQ process ID for the initial transmission is determined according to Equation 4 below.

HARQ process $ID=[\text{floor}\{CURRENT\_TTI/\text{semiPersistentSchedIntervalUL}\}]\text{modulo numberOfConfUlSPS\_Processes}$     [Equation 4]

In Equation 4, CURRENT_TTI may be defined as follows: CURRENT_TTI=[(SFN×10)+subframe number] and denote the TTI of a bundle where the initial transmission is performed. The parameter semiPersistentSchedIntervalUL may denote a UL SPS transmission interval, floor{X} may denote a maximum integer less than X, and the parameter numberOfConfUlSPS_Processes may denote the number of UL SPS processes configured for a UE.

If repetition is configured/indicated for the SPS based, grant-free based, or TTI bundling based UL transmission, it may be regulated that the HARQ process ID for the initial transmission is calculated by a specific TTI index included in a repetition chunk (e.g., the index of the first TTI in the repetition chunk).

In this case, the transmission of the TTI included in the repetition chunk (e.g., the TTI for determining the HARQ process ID) may be dropped by dynamic scheduling (e.g., non-SPS DCI) or traffic/channel with high priority. Thus, the present disclosure proposes to determine the HARQ process ID in the case of the repetition for the SPS based, grant-free based, or TTI bundling based UL transmission as follows.

Option 1: Regardless of whether the corresponding TTI is transmitted or dropped, it may be regulated that the HARQ process ID is calculated by a specific TTI index in the repetition chunk (e.g., the index of the first TTI in the repetition chunk).

Option 2: It may be regulated that the HARQ process ID is calculated by the index of an actually transmitted TTI. For example, the HARQ process ID may be determined by the index of the first non-dropped TTI among TTIs in the repetition chunk.

[Proposal 1-5]

When repetition is configured/indicated for UL transmission for a specific TB/CB (group), an OLPC parameter (e.g., P_O, alpha) and/or an increment or decrement value predefined for TPC accumulation (e.g., δ in Tables 6 to 9) may vary per the number of times a PUSCH/PUCCH is repeated.

For example, a UE may determine final transmit power by applying a different value of the OLPC parameter depending on the number of configured/indicated repetitions. As another example, the UE may consider a specific TPC command as different values depending on the number of configured/indicated repetitions.

According to an embodiment of the present disclosure, the UE may be configured with a plurality of TPC (e.g., OLPC/CLPC) parameter sets (e.g., P_O, alpha, and/or Δ) through higher layer signaling (e.g., RRC). The higher layer signaling may include cell-common higher layer signaling and/or UE-specific higher layer signaling.

When the repetition is configured for the UL signal transmission, the UE may select one of the plurality of TPC parameter sets based on the number of repetitions and then transmit a UL signal. When the number of repetitions is a first value, the UE may repeatedly transmit the UL signal with transmit power determined based on a first TPC parameter set. When the number of repetitions is a second value, the UE may repeatedly transmit the UL signal with transmit power determined based on a second TPC parameter set. As described above, the UE may control the transmit power adaptively depending on the number of repetitions. Specifically, as an example of a nominal power value P_0, when the number of repetitions is not more than a predetermined threshold, the UE may determine the transmit power based on P_0=A. When the number of repetitions is more than the predetermined threshold, the UE may determine the transmit power based on P_0=B (where A>B). As the number of repetitions increases, the value of P_0 may decrease.

In addition to Tables 6 to 9, a table may be configured to define additional values of δ according to the number of repetitions configured/indicated for the UE. For example, when the UE receives a TPC command in DCI, if the number of repetitions does not exceed a predetermined threshold, the UE may determine δ based on Table X. If the number of repetitions does not exceed the predetermined threshold, the UE may determine δ based on Table Y.

[Proposal 1-6]

In TDD, the number of consecutive DL or UL TTIs may be less than the number of configured/indicated repetitions. In this case, if a UE waits for the next transmission opportunity with the same direction, latency may increase. However, this may not be desirable when tight latency requirements are required. In the case of repetition by dynamic scheduling, an eNB may adjust the number of repetitions. In the case of repetition by semi-static scheduling, it may be difficult to adjust the number of repetitions freely. Thus, it may be regulated that while the repetition is performed for a specific direction of transmission (e.g., DL or UL transmission), if there is a TTI with the different direction, the repetition is terminated. In this case, since the transmission may be performed no more than the number of repetitions required to satisfy specific reliability requirements, it may be regulated that when the number of consecutive DL or UL TTIs is less than the number of configured/indicated repetitions, a great OLPC parameter (e.g., P_O, alpha) is applied to the repetition. Further, an extra increment or decrement value may be defined for TPC accumulation when the number of consecutive DL or UL TTIs is less than the number of configured/indicated repetitions.

As another method, it may be regulated that while the repetition is performed for a specific direction of transmission (e.g., DL or UL transmission), if there are TTI(s) with the different direction, whether the repetition is continued or stopped is determined depending on whether a gap generated by the TTI(s) is within a coherence time enough to apply DMRS bundling/sharing. For example, if it is determined that performance is degraded due to the gap generated by the TTI(s) with the different direction even though the DMRS bundling is applied, the UE may terminate the repetition. Otherwise, the UE may continue the repetition. In this case, a maximum gap corresponding to the standard of determination may be predefined on a TTI/slot/symbol basis or configured/indicated by higher layer signaling or physical layer signaling.

[Proposal 1-7]

When repetition is configured/indicated for SPS based, grant-free based, or TTI bundling based UL transmission (i.e., when UL grant DCI for scheduling each UL repetition transmission is not transmitted separately whenever the UL transmission is performed), an eNB may perform coherent combining of UL repetition transmissions received in a plurality of TTIs and expect that the reception reliability for a corresponding TB will be improved. If the power of the UL repetition transmission is changed or if a different channel/signal (having power different from that of the UL repetition transmission) is transmitted during the repetition, it may be difficult to maintain phase continuity (due to RF switching/(re-)tuning at a UE), and as a result, the coherent combining may become impossible. For example, when the repetition is configured/indicated to be performed in subframe #n and subframe #n+1 and when a sounding reference signal (SRS) needs to be transmitted in the last symbol of subframe #n, the phase continuity may not be maintained. To maintain the phase continuity, the following options may be considered.

Option 1: When the repetition is configured/indicated for the SPS based, grant-free based, or TTI bundling based UL transmission (i.e., when the UL grant DCI for scheduling each UL repetition transmission is not separately transmitted) and when the corresponding repetition transmission is over a subframe boundary, the UE may expect that no periodic/aperiodic SRS transmission is configured/indicated within the subframe before the subframe boundary (i.e., during the repetition transmission).

Option 2: When the repetition is configured/indicated for the SPS based, grant-free based, or TTI bundling based UL transmission (i.e., when the UL grant DCI for scheduling each UL repetition transmission is not separately transmitted) and when the corresponding repetition transmission is over a subframe boundary, the UE may ignore and drop periodic/aperiodic SRS transmission in the subframe before the subframe boundary (i.e., during the repetition transmission), which is configured/indicated by a cell-specific SRS configuration, a UE-specific SRS configuration, and/or an SRS request field (e.g., request for aperiodic SRS) in DCI. In this case, the UE may map a channel corresponding to the SPS based, grant-free based, or TTI bundling based UL transmission (i.e., a channel corresponding to each UL repetition transmission) to a symbol reserved for the corresponding SRS transmission and then perform the transmission. Alternatively, it may be regulated that the UE empties the symbol reserved for the corresponding SRS transmission (i.e., without mapping a PUSCH to the symbol) and transmits a shortened PUSCH (SPUSCH) for the SPS based, grant-free based, or TTI bundling based UL transmission.

Option 3: When the repetition is configured/indicated for the SPS based, grant-free based, or TTI bundling based UL transmission (i.e., when the UL grant DCI for scheduling each UL repetition transmission is not separately transmitted) and when periodic/aperiodic SRS transmission is configured/indicated within a subframe before a subframe boundary by a cell-specific SRS configuration, a UE-specific SRS configuration, and/or an SRS request field in DCI, it may be regulated that the UE terminates the repetition at the subframe boundary.

[Proposal 1-8]

Table 10 and Table 11 are extracted from section 5.5.2.1.2 of 3GPP specification TS 36.211 V15.1.0

TABLE 10

| DMRS-pattern field in uplink- | Uplink subslot number | | | | | |
|---|---|---|---|---|---|---|
| related DCI format [3] | #0 | #1 | #2 | #3 | #4 | #5 |
| 00 | 0 | 3 | 5 | 0 | 2 | 4 |
| 01 | 2 | 4 | — | 1 | 3 | — |
| 10 | — | — | — | — | 2 | — |
| 11 | — | 5 | — | — | 4 | — |

TABLE 11

| DMRS-pattern field in uplink- | Uplink subslot number | | | | | |
|---|---|---|---|---|---|---|
| related DCI format [3] | #0 | #1 | #2 | #3 | #4 | #5 |
| 00 | 0 | 3 | 5 | 0 | 2 | 4 |
| 10 | 0 | 5 | 5 | 2 | 2 | 4 |

Referring to Table 10 and Table 11, In case of subslot-PUSCH, the mapping to resource elements (k, l), in the subframe shall be in increasing order of first k for all values of k, except if the Cyclic Shift Field mapping table for DMRS bit field is set in the most recent uplink-related DCI format 7. In this case the mapping to resource element shall be in increasing order of first k only for values of k satisfying k mod 2=$\overline{\omega}$. The value of l depends on the uplink subslot number and the DMRS-pattern field in the most recent uplink-related DCI, according to Table 10 or according to Table 11 in case of semi-persistent scheduling of subslot-PUSCH (i.e. higher layer parameter sps-ConfigUL-sTTI-r15 is configured, see 3GPP TS 36.331) and with a configured periodicity of 1 subslot (i.e. semiPersistSchedIntervalUL-STTI-r15 set to sTTI1). In case of subslot-PUSCH and semi-persistent scheduling with a configured periodicity longer than 1 subslot, the mapping shall start at symbol 1 according to the first row of Table 11 (i.e. equivalent to a signalling of DMRS-pattern field set to '00'). In case no value of l is defined for the uplink subslot number, and in case no valid starting symbol index, no reference signal is transmitted associated with the uplink-related DCI format.

If a UE has no data to transmit to a buffer on a UL SPS resource (e.g., time/frequency resource) configured/indicated by a UL grant for UL SPS (or when it is not available), the UE may skip UL transmission at a UL SPS transmission timing. Such an operation is referred to as UL skipping. When the UL skipping is configured for UL SPS transmission (in particular, for sub-slot UL SPS with 1 TTI periodicity), PUSCH transmission may not be performed in every TTI depending on the buffer state of the UE. In this case, if UL DMRS sharing is indicated, the PUSCH transmission may be performed only in a TTI where no DMRS exists depending on the buffer state of the UE, and as a result, it may be difficult for an eNB to perform demodulation. The UL DMRS sharing may be instructed, for example, when a subframe includes a subslot in which no DMRS is transmitted, i.e., when DMRS-pattern field='10' (i.e., in Table 11).

When the UL skipping is configured for the UL SPS transmission (in particular, for the sub-slot UL SPS with 1 TTI periodicity), it may be regulated that the UE regards that DMRS-pattern field='00' (in Table 11) and transmits the DMRS for all TTIs. In general, in the case of the UL SPS transmission, the UE may include and transmit the DMRS in all TTIs, regardless of the value of the DMRS-pattern field in the configured UL grant (or SPS activation DCI). When the UL skipping is configured, it may be regulated that the UE does not expect that DMRS-pattern field='10'.

The above operation may be applied to subslot-PUSCH transmission by a dynamic UL grant. If the UL skipping is configured for the subslot-PUSCH transmission by the dynamic UL grant, it may be regulated that the UE regards that DMRS-pattern field='00' (in Table 11) and transmits the DMRS for all TTIs. In general, in the case of the UL SPS transmission, the UE may include and transmit the DMRS in all TTIs, regardless of the value of the DMRS-pattern field in a UL grant. When the UL skipping is configured, it may be regulated that the UE does not expect that DMRS-pattern field='10'. Alternatively, when the UL skipping is configured, it may be regulated that the UE does not expect a DMRS-pattern field state indicating that the DMRS is included for a specific TTI. As another method, when a specific UL TTI length is configured for a specific serving cell (e.g., for an operation related to a TTI length including a subslot, and more generally, DMRS sharing), it may be regulated that the UE does not expect that the UL skipping will be configured. As a further method, when the UE is configured with the UL skipping, it may be configured that only when the UE is configured with a DMRS-pattern field state including the DMRS (even though there is no data in the buffer), the UE does not perform the skipping (i.e., the UE transmits a PUSCH including predefined or dummy information) or transmits only the DMRS. That is, according to the method, since the UE transmits the DMRS even though the UE skips UL-SCH transmission, an eNB may use the corresponding DMRS in demodulation of a PUSCH transmitted in a previous or next TTI.

Since each of the examples of the proposed methods may be included as one method for implementing the present disclosure, it is apparent that each example may be regarded as a proposed method. The proposed methods may be implemented independently, but some of the proposed methods may be combined (or merged) for implementation. In addition, it may be regulated that information on whether the proposed methods are applied (or information on rules related to the proposed methods) should be transmitted from a BS to a UE through a predefined signal (e.g., a physical layer signal, a higher layer signal, etc.).

Figure 9:
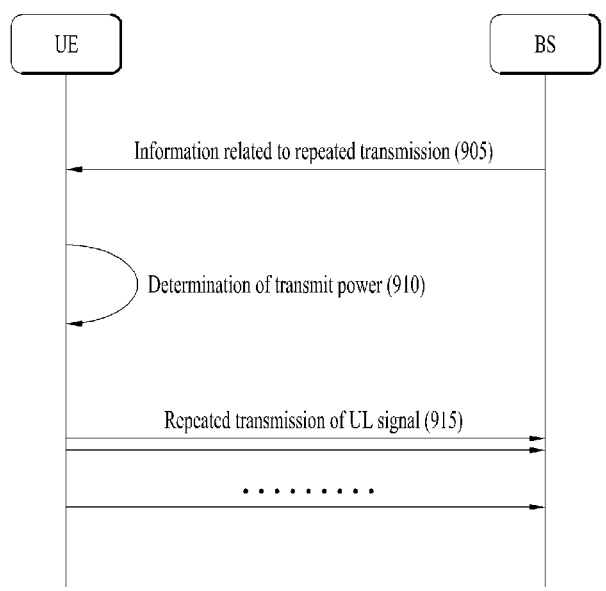
FIG. 9 is a flowchart illustrating a method of transmitting and receiving a UL signal according to an embodiment of the present disclosure.

FIG. 9 is a flowchart illustrating a method of transmitting and receiving a UL signal according to an embodiment of the present disclosure.

Referring to FIG. 9, a UE may receive, from a BS, information related to repeated transmission including the number of times a UL signal is repeatedly transmitted, N (905).

The UE may determine the transmit power of the UL signal (910). The UE may determine the transmit power of the UL signal based on the number of times the UL signal is repeatedly transmitted, N.

The UE may repeatedly transmit the UL signal N times with the determined transmit power based on the information related to the repeated transmission (S915).

For example, the UE may be configured with a plurality of power control parameter sets. In this case, the UE may select one of the plurality of power control parameter sets based on the number of times the transmission is repeated, N. Each of the plurality of power control parameter sets may be an OLPC parameter set including a nominal power value P0. When the number of times the transmission is repeated, N is more than a threshold, the UE may select a first power control parameter set. When the number of times the transmission is repeated, N is less than or equal to the threshold, the UE may select a second power control parameter set. The transmit power determined based on the first power control parameter set may be different from the transmit power determined based on the second power control parameter set.

For example, the UE may receive information including a TPC command for CLPC from the BS. In this case, the UE may determine an increment or decrement value of the transmit power according to the TPC command based on the number of times the transmission is repeated, N.

The UE may maintain the determined transmit power while repeatedly transmitting the UL signal N times The UL signal may include at least one of a PUCCH and a PUSCH. The PUSCH may be an SPS PUSCH transmitted based on SPS.

Figure 10:
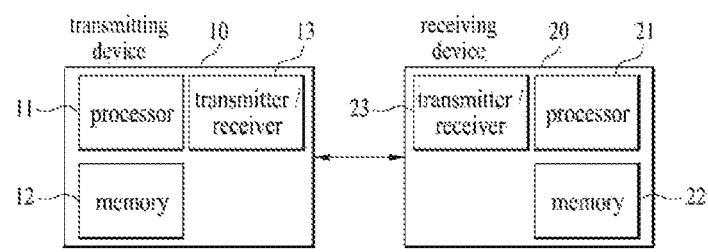
FIG. 10 is a block diagram illustrating devices for implementing embodiment(s) of the present disclosure.

FIG. 10 is a block diagram illustrating components of a transmitting device 10 and a receiving device 20 for implementing the present disclosure. The transmitting device 10 and the receiving device 20 respectively include transmitters/receivers 13 and 23 for transmitting and receiving radio signals carrying information, data, signals, and/or messages, memories 12 and 22 for storing information related to communication in a wireless communication system, and processors 11 and 21, which are operationally connected to components such as the transmitters/receivers 13 and 23 and the memories 12 and 22, configured to control the components so that corresponding devices perform at least one of the above-described embodiments of the present disclosure.

The memories 12 and 22 may store programs for processing and controlling the processors 11 and 21 and temporarily store input/output information. The memories 12 and 22 may be used as buffers. The processors 11 and 21 generally control the overall operation of various modules in the transmitting device and the receiving device. In particular, the processors 11 and 21 may perform various control functions to implement the present disclosure. Each of the processors 11 and 21 may be referred to as a controller, microcontroller, microprocessor, microcomputer, etc. The processors 11 and 21 may be implemented by hardware, firmware, software, or a combination thereof. When the present disclosure is implemented by hardware, application specific integrated circuits (ASICs), digital signal processors (DSPs), digital signal processing devices (DSPDs), programmable logic devices (PLDs), or field programmable gate arrays (FPGAs) may be included in the processors 11 and 21. When the present disclosure is implemented by firmware or software, the firmware or software may be configured to include modules, procedures, functions, etc. for performing the functions or operations of the present disclosure. The firmware or software for implementing the present disclosure may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the transmitter/receiver 13. For example, the processor 11 converts a data stream to be transmitted into K layers through demultiplexing, channel coding, scrambling, and modulation. The coded data stream is also referred to as a codeword and is equivalent to a TB which is a data block provided by a MAC layer. One TB is coded into one codeword, and each codeword is transmitted to the receiving device in the form of one or more layers. For frequency up-conversion, the transmitter/receiver 13 may include an oscillator. The transmitter/receiver 13 may include $N_t$ (where $N_t$ is a positive integer) transmit antennas.

The signal processing process of the receiving device 20 is the reverse of the signal processing process of the transmitting device 10. Under control of the processor 21, the transmitter/receiver 23 of the receiving device 20 receives radio signals transmitted by the transmitting device 10. The transmitter/receiver 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The transmitters/receivers 13 and 23 include one or more antennas. Under control of the processors 11 and 21, the antenna performs a function of transmitting signals processed by the transmitters/receivers 13 and 23 to the outside or a function of delivering radio signals received from the outside to the transmitters/receivers 13 and 23. The antenna may be referred to as an antenna port. Each antenna may correspond to one physical antenna or be configured by a combination of two or more physical antenna elements. A signal transmitted on each antenna may not be decomposed further at the receiving device 20. An RS transmitted in relation to a corresponding antenna defines an antenna observed from the perspective of the receiving device 20. Thus, the RS may allow the receiving device 20 to estimate a channel for the antenna regardless of whether the channel is a single radio channel from one physical antenna or a composite channel from a plurality of physical antenna elements including the antenna. That is, an antenna is defined such that a channel for carrying a symbol on the antenna is derived from a channel for carrying another symbol on the same antenna. When a transmitter/receiver supports multi-input multi-output (MIMO) functionality capable of transmitting and receiving data on a plurality of antennas, the transmitter/receiver may be connected to two or more antennas.

In the embodiments of the present disclosure, a UE operates as the transmitting device 10 in UL and as the receiving device 20 in DL. In the embodiments of the present disclosure, a BS or an eNB operates as the receiving device 20 in UL and as the transmitting device 10 in DL.

The transmitting device 10 and/or the receiving device 20 may be configured to implement at least one of the above-described embodiments of the present disclosure or a combination of at least two thereof.

The detailed description of the preferred embodiments of the present disclosure has been given to enable those skilled in the art to implement and practice the disclosure. Although the disclosure has been described with reference to the preferred embodiments, those skilled in the art will appreciate that various modifications and variations can be made in the present disclosure without departing from the spirit or scope of the disclosure described in the appended claims. Accordingly, the disclosure should not be limited to the embodiments described herein but should be accorded the broadest scope consistent with the principles and novel features disclosed herein.

INDUSTRIAL APPLICABILITY

The present disclosure may be applicable to wireless communication devices such as a UE, a relay, a BS, etc.

The invention claimed is:

1. A method of transmitting a signal by a user equipment (UE) in a wireless communication system, the method comprising:
   receiving, from a base station, information related to repeated transmission including a number of times N an uplink signal is to be repeatedly transmitted;
   determining transmission power of the uplink signal; and
   repeatedly transmitting the uplink signal N times with the determined transmission power based on the information related to the repeated transmission,
   wherein the UE determines the transmission power of the uplink signal based on the number of times N the uplink signal is to be repeatedly transmitted,
   wherein the UE is configured with a plurality of power control parameter sets,
   wherein the UE selects a first power control parameter set based on the N number of times the transmission is repeated more than a threshold,
   wherein the UE selects a second power control parameter set based on the N number of times the transmission is repeated less than or equal to the threshold, and wherein transmission power determined based on the first power control parameter set is different from transmission power determined based on the second power control parameter set.

2. The method of claim 1, wherein each of the plurality of power control parameter sets is an open loop power control (OLPC) parameter set including a nominal power value P0.

3. The method of claim 1, further comprising:
receiving information including a transmission power control (TPC) command for closed loop power control (CLPC) from the base station, wherein the UE determines an incremented or decrement value for transmission power according to the TPC command based on the number of times N the transmission is repeated.

4. The method of claim 1, wherein the UE maintains the determined transmission power while repeatedly transmitting the uplink signal N times.

5. The method of claim 1, wherein the uplink signal includes at least one of a physical uplink control channel (PUCCH) and a physical uplink shared channel (PUSCH).

6. The method of claim 5, wherein the PUSCH is a semi-persistent scheduling (SPS) PUSCH transmitted based on SPS.

7. A user equipment (UE) comprising:
a transceiver; and
a processor configured to:
control the transceiver to receive, from a base station, information related to repeated transmission including a number of times N an uplink signal is repeatedly transmitted;
determine transmission power of the uplink signal; and
repeatedly transmit the uplink signal N times with the determined transmission power based on the information related to the repeated transmission,
wherein the processor is further configured to determine the transmission power of the uplink signal based on the number of times N the uplink signal is to be repeatedly transmitted,
wherein the UE is configured with a plurality of power control parameter sets,
wherein the processor is configured to select a first power control parameter set based on the number of times N the transmission is repeated more than a threshold,
wherein the processor is configured to select a second power control parameter set based on the number of times N the transmission is repeated less than or equal to the threshold, and
wherein transmission power determined based on the first power control parameter set is different from transmission power determined based on the second power control parameter set.

8. The UE of claim 7, wherein each of the plurality of power control parameter sets is an open loop power control (OLPC) parameter set including a nominal power value P0.

9. The UE of claim 7, wherein the processor is further configured to receive information including a transmission power control (TPC) command for closed loop power control (CLPC) from the base station through the transceiver, and wherein the processor is further configured to determine an incremented or decremented value for the transmission power according to the TPC command based on the number of times N the transmission is repeated.

10. The UE of claim 7, wherein the processor is further configured to maintain the determined transmission power while the uplink signal is repeatedly transmitted N times.

11. The UE of claim 7, wherein the uplink signal includes at least one of a physical uplink control channel (PUCCH) and a physical uplink shared channel (PUSCH).

12. The UE of claim 7, wherein the UE is capable of communicating with at least one of another UE, a UE related to an autonomous driving vehicle, a base station or a network.

* * * * *